United States Patent
Holder

(10) Patent No.: US 7,401,751 B2
(45) Date of Patent: Jul. 22, 2008

(54) FLUID FLOW REGULATOR WITH OVERPRESSURE RELIEF FUNCTION

(75) Inventor: Robert Edward Holder, Los Angeles, CA (US)

(73) Assignee: Eaton Corporation, Cleveland, OH (US)

( * ) Notice: Subject to any disclaimer, the term of this patent is extended or adjusted under 35 U.S.C. 154(b) by 413 days.

(21) Appl. No.: 11/136,669

(22) Filed: May 24, 2005

(65) Prior Publication Data

US 2006/0266887 A1  Nov. 30, 2006

(51) Int. Cl.
*B64C 1/14* (2006.01)
(52) U.S. Cl. .................................. 244/129.5; 251/325
(58) Field of Classification Search ............. 244/129.5; 137/625.49; 251/188, 325, 354
See application file for complete search history.

(56) References Cited

U.S. PATENT DOCUMENTS

| | | | |
|---|---|---|---|
| 3,294,174 A * | 12/1966 | Vincent | 166/321 |
| 3,424,196 A | 1/1969 | Donner | |
| 4,237,922 A | 12/1980 | Maier | |
| 4,655,245 A | 4/1987 | Gellerson | |
| 5,772,182 A * | 6/1998 | Stambaugh, Sr. et al. | 251/325 |

FOREIGN PATENT DOCUMENTS

DE 9409659.7 9/1994
WO PCT/EO2003/012374 5/2004

* cited by examiner

*Primary Examiner*—Rob Swiatek
(74) *Attorney, Agent, or Firm*—Bradley J. Dieorich

(57) ABSTRACT

A flow regulator includes a body with an aperture into which an inlet and an outlet open. A pin has a bore extending therein and communicating with the outlet. A first aperture, a second aperture and a bypass orifice are spaced longitudinally along the pin and extend there through opening into the bore. A valve member is slideably located around the pin and is biased by a spring into a first position along the pin in which the valve member closes the first aperture while opening the second aperture. When a pressure differential between the inlet and outlet exceeds a first level, the valve member moves away from the first position and begins covering the second aperture. Thereafter continuing increase of the pressure differential above a greater second level results in the valve member moving into a second position at which both the first and second apertures are closed. However in the second position, a secondary flow path exists between the inlet and the outlet through the bypass orifice. Further increase of the pressure differential significantly above the second level causes the valve member to move into a pressure relief position in which the first aperture is open while the second aperture remains closed.

22 Claims, 3 Drawing Sheets

FLUID FLOW REGULATOR WITH OVERPRESSURE RELIEF FUNCTION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to fluid powered actuator systems for operating a mechanism, such as opening an aircraft door in an emergency; and more particularly to an apparatus which regulates the fluid flow to control the speed of the actuator.

2. Description of the Related Art

Commercial aircraft incorporate mechanisms for opening the doors of the passenger cabin in the event of an emergency. One known emergency door activating mechanism utilizes a piston/cylinder assembly that is operatively connected between the body of the aircraft and the door. A reservoir of gas, such as nitrogen, under high pressure is connected to the cylinder. When it is desired to open the door, the pressurized gas is released from the reservoir and applied to the cylinder thereby rapidly moving the piston and opening the door. International Patent Application PCT/EP2003/012374 and U.S. patent application Ser. No. 11/045,205 filed on Jan. 28, 2005 describe hydraulic systems for operating aircraft doors during an emergency.

Although the emergency door activation system must rapidly operate the door to a fully open position, it should do so without damaging the door and other parts of the aircraft. It should be recognized that in many emergency situations, the aircraft is not severely damaged and can be repaired for subsequent use. As a consequence, activation of the emergency door system ought not result in further aircraft damage which results in additional repair costs.

It is therefore desirable that the hydraulic operating mechanism apply the pressurized fluid to the actuator in a controlled manner so that the actuator does not operate at an excessive speed.

SUMMARY OF THE INVENTION

A system for operating a mechanism comprises a source that furnishes pressurized fluid into a supply conduit that is connected to a fluid powered actuator. The actuator is operably coupled to the mechanism. For example, the mechanism may be a door of an aircraft in which the pressurized fluid is released from the source during an emergency to open the door.

The flow of the pressurized fluid to the fluid powered actuator is controlled by a flow regulator in series with the supply conduit. That flow regulator comprises a housing with a chamber into which an inlet opens and with a passage having an outlet. The housing includes a first aperture and a second aperture both extending between the chamber and the passage and further including a bypass orifice that provides a secondary flow path between the inlet and the outlet. A valve member is movably located in the chamber and selectively opens and closes the first and second apertures. A spring biases the valve member into a first position in which the valve member closes the first aperture and opens the second aperture.

Fluid flow between the inlet and the outlet produces a pressure differential. When the pressure differential exceeds a first level, the valve member moves away from the first position and partially covers the second aperture thereby limiting the flow. When the pressure differential increases above a greater second level, the valve member moves into a second position at which both the first and second apertures are closed, however flow still occurs between the inlet and the outlet through the relatively small secondary flow path provided by the bypass orifice. Further increase of the pressure differential, significantly above the second level, causes the valve member to move into a pressure relief position in which the first aperture is opened. The pressure relief position prevents an excessively large pressure from occurring at the inlet.

DETAILED DESCRIPTION OF THE INVENTION

Figure 1:
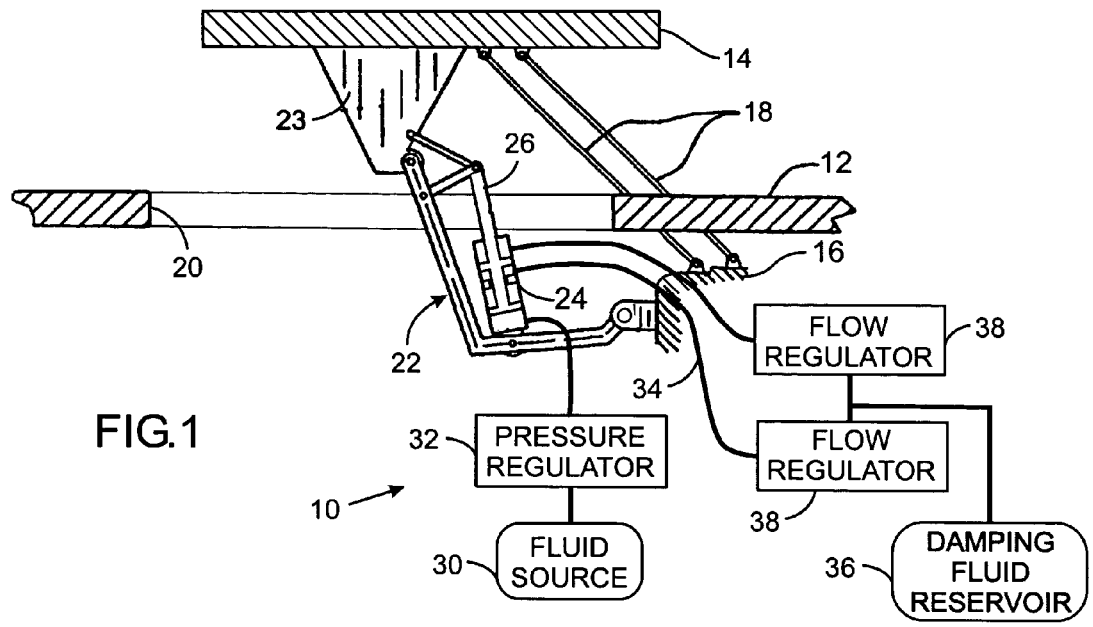
FIG. 1 schematically illustrates an aircraft door being opened by an emergency activation apparatus.

With initial reference to FIG. 1, the present invention is being described in the context of an aircraft 12 having a door 14 which is required to be opened during an emergency. However, the inventive flow regulator may be used in a wide variety of fluid power systems, both pneumatic and hydraulic systems. The door 14 is moveably connected to the frame 16 of the aircraft 12 by a pair of ties 18, each of which is pivotally connected at opposite ends to the door and the aircraft frame. That connection enables the door 14 to swing outward from the door opening 20 to allow people to enter or exit the aircraft through the doorway.

The emergency activating apparatus 10 includes a linkage 22 with one end pivotally connected to the aircraft frame 16 and an opposite end pivotally attached to a bracket 23 secured to the inside surface of the door 14. A pneumatic cylinder 24 and a piston rod 26 therein are connected between different arms of the linkage 22. A pressurized fluid source 30 is coupled by a pressure regulator 32 and a conduit 34 to the pneumatic cylinder 24. A damping fluid reservoir 36 is connected by separate flow regulators 38 to both chambers on opposite sides of the piston in the pneumatic cylinder 24 to provide a mechanism that controls the rate at which the door operates.

When the door 14 is in the closed position within the door opening 20, activation of the fluid source 30 applies pressurized fluid to the cylinder 24 causing the piston rod 26 to extend farther from the cylinder, thereby applying force to the linkage 22. The application of that force moves the arms of the linkage 22 with respect to one another in a way that drives the door 14 outward from the opening 20 in the aircraft, as depicted by an intermediate position of the door shown in FIG. 1. Further application of pressurized fluid to the cylinder 24 applies additional force to the linkage so that the door continues to move outward, ultimately reaching a fully opened position. The rate at which the cylinder 24 moves the door is controlled by the flow regulators 38 and the damping fluid reservoir 36.

Figure 2:
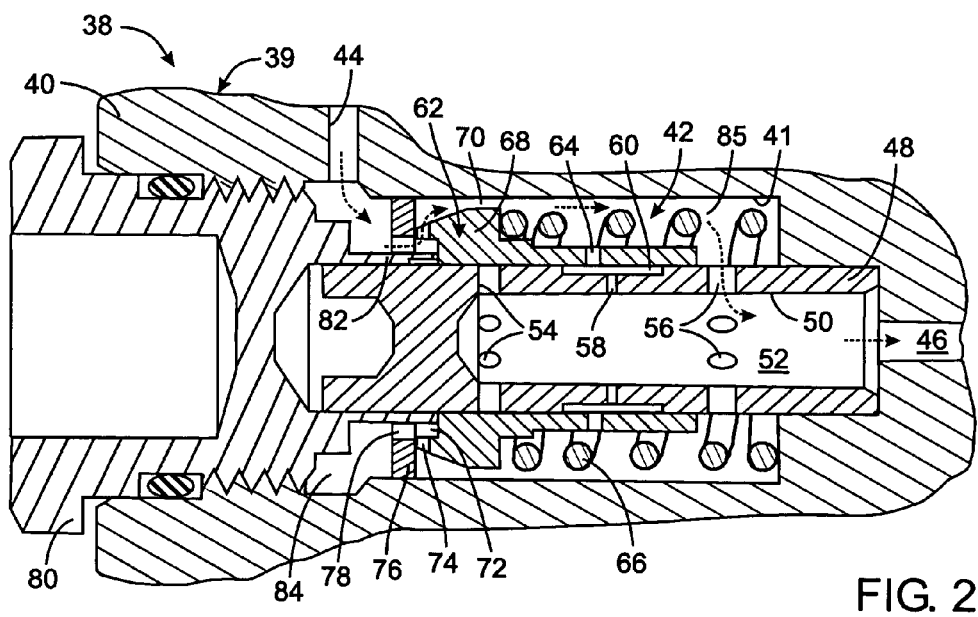
FIG. 2 is a cross section view of a novel flow regulator of the emergency activation apparatus with flow regulator in a first state in which fluid is flowing in a forward direction through the device.

Referring to FIG. 2, the flow regulator 38 is located within a housing 39 that comprises a body 40 and a pin 48. The body 40 has an aperture 41 extending from one surface forming a chamber 42 with an inlet 44 that leads from a connection to the fluid source 30. The pin 48 projects into the chamber 42 and has a bore 50 that forms an internal passage 52 that opens into a outlet 46 to which the supply conduit 34 to the door cylinder 24 is connected. Sets of first and second apertures 54 and 56 and a set of bypass orifices 58 project through the side wall of the pin 48 between the surrounding second cavity 85 and the passage 52. The first apertures 54 combine to form a variable pressure relief orifice at the innermost section of the pin passage 52. The relatively small bypass orifices 58 extend between an annular notch 60 around the outer circumference of the pin 48 at a central portion along the pin. The second apertures 56 collectively form a variable flow control orifice that is proximate to the open end of the passage 52. The numbers of the first and second apertures and bypass orifices are selected to provide the necessary amount of fluid flow in each state of the flow regulator 38 that will be described.

The pin 48 extends through a central opening in a valve member 62, in the form of a tubular sleeve, that is able to slide along the exterior surface of the pin 48. The valve member 62 is biased toward the inlet end of the chamber 42 by a spring 66. A proximate end of the valve member 62, adjacent the inlet 44, has a flange 68 projecting outwardly and spaced from the inner surface of the chamber 42, thereby forming a gap 70 therebetween. The proximate end of the valve member has an annular recess 72 around the pin 48 with a plurality of notches 74 extending radially outward therefrom.

A ring-shaped piston 76 is located around the pin 48 between the valve member 62 and the inlet 44 and is able to slide within the chamber 42 against and away from the end of the valve member. The piston 76 divides the chamber 42 into a first cavity 84 into which the inlet 44 opens and a second cavity 85 around the pin and within which the spring 66 is located. The clearance between the outer diameter of the piston 76 is relatively small to prevent significant fluid flow between that piston and the wall of the aperture 41. The inner diameter of the piston 76 is significantly greater than the outer diameter of the pin 48 which provides an opening 78 therebetween thereby forming a fluid passage between the first and second cavities 84 and 85.

A plug 80 is threaded into the opening of the aperture 41 at the surface of body 40 thereby defining one end of the chamber 42. The plug 80 has an interior tubular portion 82 with an aperture into which an exposed end of the pin 48 extends. The tubular portion 82 extends along the outer surface of the pin through the interior opening of the piston 76 forming a stop against which the valve member 62 is biased by the spring 66.

When the exemplary system for operating an aircraft door is activated in an emergency, pressurized fluid applied to the flow regulator inlet 44 is communicated to the first cavity 84, thereby forcing the piston 76 against the end of the sleeve-like valve member 62 as illustrated in FIG. 2. In this state, the notches 74 on the end of the valve member 62 form fixed flow control orifices that limit the flow of fluid through the flow regulator 38. As depicted by the dashed lines with arrows, the pressurized fluid continues to flow through the notches 74, past the gap 70 around the valve member flange 68 and into the second cavity 85. From that second cavity 85, the fluid continues to flow through the set of second apertures 56 into the bore of pin 48 and ultimately through the outlet 46 to the door cylinder 24.

As the flow increases, a differential pressure across the flow control orifice formed by the piston 76 and the valve member notches 74 increases and creates a net force that opposes the force of spring 66. The spring force may be adjusted by varying the amount that the plug 80 is screwed into the body 40 against the valve member 62 thereby compressing the spring to the desired force level. As flow continues to increase the differential pressure, a balance of forces is reached when the combination of the orifice restrictions allows a magnitude of flow such that the force exerted on the piston 76 by the pressure differential equals the force of spring 66. Further differential pressure increase thereafter overcomes the spring force and drives the piston/valve member combination to the right in FIG. 2.

Figure 3:
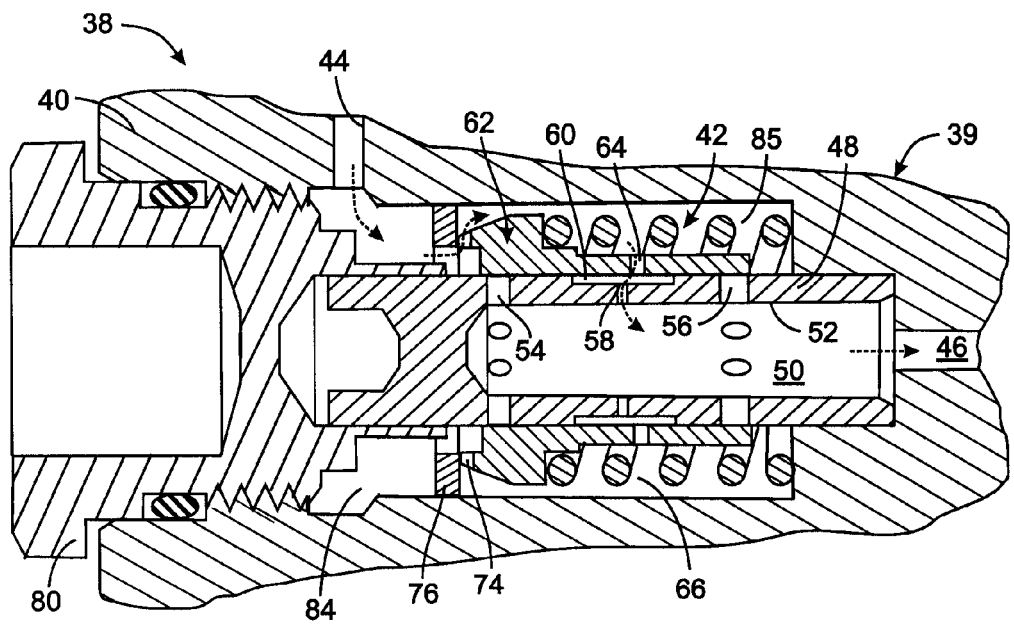
FIG. 3 is a cross section view of the flow regulator in a second state in which the forward fluid flow is near a regulation set flow point.

As the valve member 62 moves to the right, its end that is remote from the piston 76 begins to cover up the second apertures 56 in the pin 48 thereby restricting the flow there through. If the differential pressure continues to increase, the valve member 62 may reach the position depicted in FIG. 3 in which all of the first and second apertures 54 and 56 in the pin 48 are fully closed. However, even in this state, a relatively small secondary flow path exists through aperture 64 in the valve member and the bypass orifice 58 in the pin 48. This secondary flow path ensures that fluid flow never completely stops and the actuator motion always occurs, although at a relatively low rate. Thus, even if the flow regulator 38 fails in the closed state, some flow still occurs to the door actuator cylinder 24 during an emergency.

Figure 4:
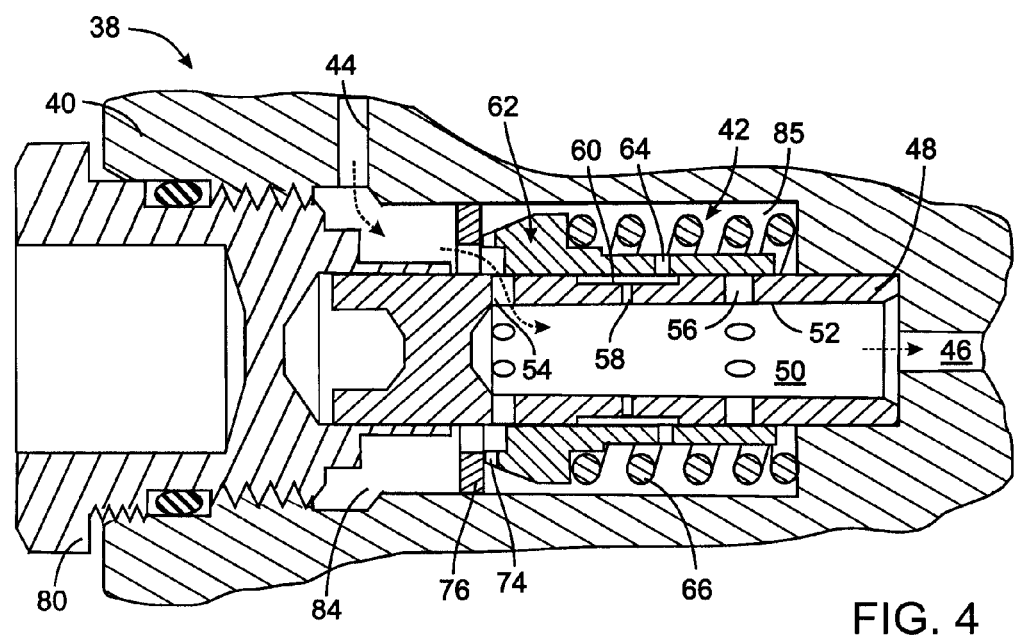
FIG. 4 is a cross section view of the flow regulator in a third forward fluid flow state.

If the pressure at the inlet 44 and thus in the first cavity 84 of the flow regulator 38 increases above an excessively high magnitude, the combination of the piston 76 and valve member 62 is driven farther to the right into a position illustrated in FIG. 4, at which the first apertures 54 begin to open. Opening of the first apertures 54 provides a pressure relief passage through the flow regulator 38 which allows excess flow to pass directly from the inlet 44 to the outlet 46. This latter state of the flow regulator prevents the source pressure from reaching an unacceptable magnitude. Note that the flow through the first apertures 54 in the pin 48 bypasses the flow control orifice formed by the notches 74 in the valve member 62. Thus a relatively large passage with a very low pressure drop is formed through the flow regulator 38 in the pressure relief state.

Figure 5:
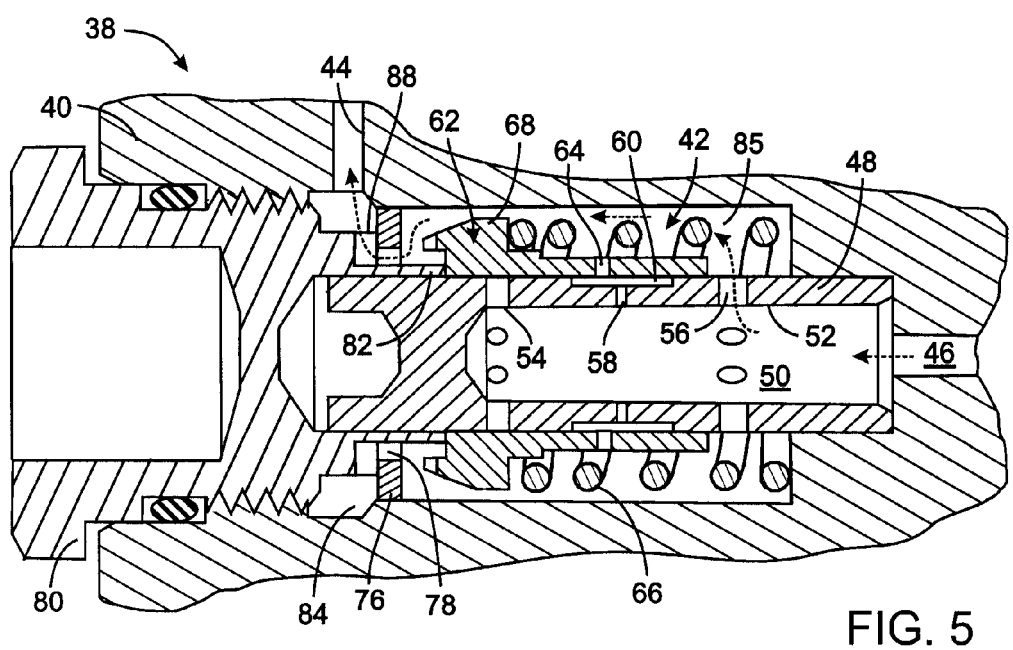
FIG. 5 is a cross section view of the flow regulator in a reverse flow state.

With reference to FIG. 5, the flow regulator 38 can accommodate flow in the reverse direction, i.e. from the outlet 46 to the inlet 44. In this case, the pressure at the outlet 46 is greater than the pressure at the inlet 44, allowing the force of the spring 66 to push the sleeve-like valve member 62 into abutment with the tubular portion 82 of plug 80. The fluid flows from the outlet 46 through the second apertures 56 in the pin 48, the second cavity 85, and past the flange 68 of the valve member 62. The fluid pressure the forces the piston 76 against an outer rim 88 of the plug 80, thereby allowing fluid to continue to flow through the inner opening 78 of the piston to the inlet 44. This flow path is relatively large and unrestricted, thereby creating a relatively low pressure drop across the flow regulator 38.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A flow regulator comprising:
a housing having a chamber into which an inlet opens and a passage with an outlet, the housing including a first aperture and a second aperture both extending between the chamber and the passage and further including a bypass orifice providing a secondary flow path between the inlet and the outlet;
a valve member movably located in the chamber and selectively opening and closing the first and second apertures; and
a spring biasing the valve member into a first position in which the valve member closes the first aperture and opens the second aperture;
wherein fluid flow between the inlet and the outlet produces a pressure differential, when the pressure differential exceeds a first level the valve member moves away from the first position partially covering the second aperture, when the pressure differential increases above a greater second level the valve member moves into a second position at which both the first and second apertures are closed with the secondary flow path existing between the inlet and the outlet through the bypass orifice, further increase of the pressure differential significantly above the second level causes the valve member to move into a pressure relief position in which the first aperture is opened.

2. The flow regulator as recited in claim 1 wherein the second aperture is closed by the valve member in the pressure relief position.

3. The flow regulator as recited in claim 1 wherein the valve member comprises an aperture which communicates with the bypass orifice when both the first and second apertures are closed.

4. The flow regulator as recited in claim 1 further comprising an annular piston that moves within the chamber between the inlet and the valve member in response to pressure produced by the fluid flow between the inlet and the outlet.

5. The flow regulator as recited in claim 4 wherein the piston moves against an end of the valve member, and wherein the end of the valve member has a notch that cooperates with the piston to form a flow control orifice which restricts fluid flow between the inlet and the outlet.

6. The flow regulator as recited in claim 4 wherein a greater pressure at the outlet than at the inlet causes the piston to move away from the valve member, thereby enlarging a flow path between the outlet and the inlet.

7. The flow regulator as recited in claim 1 further comprising a mechanism for adjusting a force exerted on the valve member by the spring.

8. The flow regulator as recited in claim 1 further comprising a plurality of first apertures.

9. The flow regulator as recited in claim 1 further comprising a plurality of second apertures.

10. A flow regulator comprising:
a body having a chamber into which an inlet and an outlet open;
a pin in the chamber and having with a bore in communication with the outlet, a first aperture and a second aperture spaced along the pin and opening into the bore and the chamber, the pin further comprising a bypass orifice that provides a secondary flow path between the inlet and the outlet;
a tubular valve member slideably located around the pin and having an end proximate to the inlet with a recess around the pin and with at least one notch extending radially outward from the notch forming a fluid path;
a spring biasing the valve member along the pin into a first position in which the valve member closes the first aperture while opening the second aperture; and
an annular piston around the pin and slidable within the chamber between the inlet and the valve member in response to pressure produced by the fluid flow between the inlet and the outlet;
wherein fluid flow between the inlet and the outlet produces a pressure differential, when the pressure differential exceeds a first level the piston moves into contact with the end of the pin thereby confining fluid flow between the inlet and the outlet to passing through the notch and the valve member moves away from the first position partially covering the second aperture, when the pressure differential increases above a greater second level the valve member moves into a second position at which both the first and second apertures are closed with a secondary flow path existing between the inlet and the outlet, further increase of the pressure differential significantly above the second level causes the valve member to move into a pressure relief position in which the first aperture opens into the recess in the valve member.

11. The flow regulator as recited in claim 10 wherein the second aperture is closed by the valve member in the pressure relief position.

12. The flow regulator as recited in claim 10 wherein the valve member comprises an aperture which communicates with the bypass orifice when both the first and second apertures are closed.

13. The flow regulator as recited in claim 10 wherein a greater pressure at the outlet than at the inlet causes the piston to move away from the valve member, thereby enlarging a flow path between the outlet and the inlet.

14. The flow regulator as recited in claim 10 further comprising a mechanism for adjusting a force exerted by the spring on the valve member.

15. The flow regulator as recited in claim 10 further comprising a plurality of first apertures in the pin.

16. The flow regulator as recited in claim 10 further comprising a plurality of second apertures in the pin.

17. An apparatus for operating a door of an aircraft in an emergency, said apparatus comprising:
a fluid powered actuator connected to operate the door;
a source of pressurized fluid coupled to the fluid powered actuator;
a damping fluid reservoir; and
a flow regulator coupling the damping fluid reservoir to the fluid powered actuator, and comprising:
a housing having a chamber into which an inlet opens and a passage with an outlet, the housing including a first aperture and a second aperture both extending between the chamber and the passage and further including a bypass orifice providing a secondary flow path between the inlet and the outlet;
a valve member movably located in the chamber and selectively opening and closing the first and second apertures; and
a spring biasing the valve member into a first position in which the valve member closes the first aperture and opens the second aperture;
wherein fluid flow between the inlet and the outlet produces a pressure differential, when the pressure differential exceeds a first level the valve member moves away from the first position partially covering the second aperture, when the pressure differential increases above a greater second level the valve member moves into a second position at which both the first and second apertures are closed with the secondary flow path existing between the inlet and the outlet through the bypass orifice, further increase of the pressure differential significantly above the second level causes the valve member to move into a pressure relief position in which the first aperture is opened.

18. The flow regulator as recited in claim 17 wherein the second aperture is closed by the valve member in the pressure relief position.

19. The flow regulator as recited in claim 17 wherein the valve member comprises an aperture which communicates with the bypass orifice when both the first and second apertures are closed.

20. The flow regulator as recited in claim 17 further comprising an annular piston that moves within the chamber between the inlet and the valve member in response to pressure produced by the fluid flow between the inlet and the outlet.

21. The flow regulator as recited in claim 20 wherein the piston moves against an end of the valve member, and wherein the end of the valve member has a notch that cooperates with the piston to form a flow control orifice which restricts fluid flow between the inlet and the outlet.

22. The flow regulator as recited in claim 20 wherein a greater pressure at the outlet than at the inlet causes the piston to move away from the valve member, thereby enlarging a flow path between the outlet and the inlet.

* * * * *